United States Patent
Smitt et al.

(10) Patent No.: US 10,367,758 B2
(45) Date of Patent: Jul. 30, 2019

(54) MERGING READ REQUESTS IN NETWORK DEVICE ARCHITECTURE

(71) Applicant: Marvell World Trade Ltd., St. Michael (BB)

(72) Inventors: Nicolai Asbjorn Smitt, Copenhagen (DK); Jacob Jul Schroder, Lyngby (DK)

(73) Assignee: Marvell World Trade Ltd., St. Michael (BB)

(*) Notice: Subject to any disclaimer, the term of this patent is extended or adjusted under 35 U.S.C. 154(b) by 0 days.

(21) Appl. No.: 15/702,371

(22) Filed: Sep. 12, 2017

(65) Prior Publication Data
US 2018/0077059 A1 Mar. 15, 2018

Related U.S. Application Data

(60) Provisional application No. 62/393,390, filed on Sep. 12, 2016.

(51) Int. Cl.
*H04L 12/18* (2006.01)
*H04L 12/741* (2013.01)
(Continued)

(52) U.S. Cl.
CPC ............ *H04L 49/201* (2013.01); *H04L 12/18* (2013.01); *H04L 12/1881* (2013.01);
(Continued)

(58) Field of Classification Search
CPC ... H04L 12/18; H04L 12/1836; H04L 12/184; H04L 12/1863–1886;
(Continued)

(56) References Cited

U.S. PATENT DOCUMENTS 6,032,190 A 2/2000 Bremer et al.
6,807,179 B1 10/2004 Kanuri et al.
(Continued)

FOREIGN PATENT DOCUMENTS

CN 1677952 A 10/2005
WO WO-99/07180 A2 2/1999

OTHER PUBLICATIONS

International Search Report and Written Opinion in International Patent Application No. PCT/IB2017/055507, dated Dec. 1, 2017 (10 pages).

(Continued)

*Primary Examiner* — Timothy J Weidner (57) ABSTRACT

Packet data corresponding to a multicast (MC) packet received by a network device is stored in a packet memory. A header of the MC packet is analyzed to determine two or more ports via which the MC packet is to be transmitted. It is determined that two or more pending read requests are to read packet data from a particular memory location in the packet memory. In response to determining that the two or more pending read requests are to read packet data from the particular memory location, the packet data is read a single time from the particular memory location. Respective instances of the packet data read from the particular memory location are provided to respective two or more read client devices for subsequent transmission of the packet data via the two or more ports determined by the packet processor.

20 Claims, 5 Drawing Sheets

(51) Int. Cl.
*H04L 12/761* (2013.01)
*H04L 12/879* (2013.01)
*H04L 12/927* (2013.01)
*H04L 12/931* (2013.01)

(52) U.S. Cl.
CPC .............. *H04L 45/16* (2013.01); *H04L 45/74* (2013.01); *H04L 47/806* (2013.01); *H04L 49/901* (2013.01)

(58) Field of Classification Search
CPC . H04L 12/4679–4695; H04L 29/06455; H04L 29/0653; H04L 41/085–0873; H04L 45/16; H04L 45/54; H04L 45/74–748; H04L 47/00; H04L 47/15; H04L 47/806; H04L 49/201–203; H04L 49/90–9094; H04L 61/2069; H04L 65/4076; H04L 69/22

See application file for complete search history.

(56) References Cited

U.S. PATENT DOCUMENTS

| | | | |
|---|---|---|---|
| 7,636,319 | B2 | 12/2009 | Shankar et al. |
| 7,729,351 | B2 | 6/2010 | Tatar et al. |
| 7,924,860 | B1 | 4/2011 | Frailong et al. |
| 7,991,926 | B1 | 8/2011 | Arad |
| 8,358,651 | B1 | 1/2013 | Kadosh et al. |
| 9,112,708 | B1 | 8/2015 | Arad et al. |
| 9,374,303 | B1 * | 6/2016 | Ulman .................. H04L 49/201 370/390 |
| 9,571,541 | B1 | 2/2017 | Bishara et al. |
| 2004/0095934 | A1 | 5/2004 | Cheng et al. |
| 2005/0207417 | A1 * | 9/2005 | Ogawa .................... H04L 47/15 370/390 |
| 2007/0168531 | A1 | 7/2007 | Sitaraman et al. |
| 2007/0171927 | A1 | 7/2007 | Paik et al. |
| 2008/0037531 | A1 | 2/2008 | Donoghue et al. |
| 2008/0315985 | A1 | 12/2008 | Johnsen et al. |
| 2010/0142398 | A1 | 6/2010 | Arad et al. |
| 2011/0007741 | A1 | 1/2011 | Kreeger et al. |
| 2011/0149729 | A1 | 6/2011 | Benner et al. |
| 2011/0164616 | A1 | 7/2011 | Kloth et al. |
| 2012/0002546 | A1 | 1/2012 | Sundararaman et al. |
| 2012/0177047 | A1 | 7/2012 | Roitshtein |
| 2013/0083796 | A1 * | 4/2013 | Matthews ............. H04L 49/201 370/390 |
| 2013/0223281 | A1 | 8/2013 | Pandit |
| 2014/0098816 | A1 | 4/2014 | Matthews et al. |
| 2014/0169378 | A1 | 6/2014 | Shumsky et al. |
| 2014/0192815 | A1 | 7/2014 | Shumsky et al. |

OTHER PUBLICATIONS

Bhattachryya, "An overview of source specific multicast (SSM)," The Internet Society, RFC3569, pp. 1-14 (Jul. 2003).
Cain et al., "Internet Group Management Protocol, Version 3" The Internet Society, RFC3376, pp. 1-53 (Oct. 2002).
Speakman et al., "PGM Reliable Transport Protocol Specifications," The Internet Society, RFC3208, pp. 1-111 (Dec. 2001).
U.S. Appl. No. 15/428,791, Bishara et al., "Network Device Architecture Using Cache for Multicast Packets," filed Feb. 9, 2017.

* cited by examiner

| Address | Read mask |
|---|---|
| A.0 308a | (1, 1, 1) 310a |
| B.12 308b | (0, 1, 0) 310b |
| ... | ... |
| C.15 308z | (0, 1, 1) 310z |

Entry 0 304a
Entry 1 304b
Entry N 304z

| | Data | Address | Read mask |
|---|---|---|---|
| Entry 0 354a | X 356a | A.0 358a | (1, 1, 1) 360a |
| Entry 1 354b | Y 356b | B.12 358b | (0, 1, 0) 360b |
| ... | | | |
| Entry N 354z | Z 356z | C.15 358z | (0, 1, 1) 360z |

MERGING READ REQUESTS IN NETWORK DEVICE ARCHITECTURE

CROSS-REFERENCES TO RELATED APPLICATIONS

This disclosure claims the benefit of U.S. Provisional Patent Application No. 62/393,390, entitled "Micro Switch Read Request Collapse," filed on Sep. 12, 2016, which is hereby incorporated by reference herein in its entirety.

FIELD OF TECHNOLOGY

The present disclosure relates generally to network devices such as network switches, bridges, routers, etc., and more particularly, to architectures in network devices for handling multicast packets.

BACKGROUND

Network switches, such as bridges and routers, forward packets through a network based on addresses in the packets. A network switch typically includes a plurality of ports coupled to different network links. The network switch typically receives a packet via one port and processes address information in a header of the packet to decide via which other port or ports the network switch should transmit the packet. The network switch then forwards the packet to the determined one or more other ports. In various network switches, entire packets, or payloads of the packets, are stored in a packet memory during processing, and are read from the packet memory after processing and before forwarding to the other port or ports, irrespective of whether the packet is to be forwarded to a single port or to multiple ports. Because network switches often handle packets being communicated via very high rate communication links, packets typically must be written to and read from the packet memory at high rates and the packet memory typically must be capable of handling a high throughput of packets.

SUMMARY

In an embodiment, a network device comprises a packet memory configured to store packet data corresponding to a multicast (MC) packet received by the network device from a network link. The network device also comprises a packet processor configured to at least to determine two or more ports via which the MC packet is to be transmitted from the network device. The network device additionally comprises a memory controller device coupled to the packet memory, the memory controller device configured to determine that two or more pending read requests received by the memory controller device are to read packet data from a particular memory location in the packet memory; in response to the determining, read the packet data a single time from the particular memory location; and provide respective instances of the packet data read from the particular memory location to respective two or more read client devices for subsequent transmission of the packet data via the two or more ports determined by the packet processor.

In another embodiment, a method of reading, from a packet memory, data corresponding to multicast packets in a network device, includes storing, at a particular memory location in the packet memory, packet data corresponding to a multicast (MC) packet received by the network device from a network link. The method additionally includes analyzing information in a header of the MC packet to determine two or more ports via which the MC packet is to be transmitted. The method also includes determining, with a memory controller device, that two or more pending read requests are to read packet data from the particular memory location in the packet memory. The method further includes in response to determining that the two or more pending read requests are to read packet data from the particular memory location, reading, with the memory controller device, the packet data a single time from the particular memory location, and providing, with the memory controller device, respective instances of the packet data read from the particular memory location to respective two or more read client devices for subsequent transmission of the packet data via the two or more ports determined by the packet processor.

DETAILED DESCRIPTION

In various embodiments described herein, a read request merging technique is utilized to improve the throughput of a network device. For example, in an embodiment in which a network device (e.g., a network switch, bridge, router, etc.) handles multicast (MC) packets, the network device utilizes read request merging technique for MC packets to reduce the number of times that the MC packet needs to be read from a packet memory. According to an embodiment, a single packet is received at the network device and stored in a packet memory, but the network device determines that the packet is to be multicast to two or more separate destinations, in other words that multiple instances of the MC packet are to be respectively forwarded via multiple ports to the two or more separate locations. In prior art devices, such an MC packet was read from the packet memory each time an instance of the MC packet was to be multicast to a different port. In an embodiment described below, however, the network device determines that multiple pending read requests are to read packet data corresponding to an MC packet from a memory location in the packet memory, the network device reads the packet data a single time from the memory location in the packet memory. In an embodiment, the packet data that is read once from the memory location in the packet memory is replicated to generate two or more instances of the packet data Ones of the two or more instances of the packet data are joined to a packet header corresponding to a MC instance to thereby reconstitute multiple MC packets each of which is to be sent to a particular destination, in an embodiment. Respective ones of the instances of the reconstructed packets are transmitted via respective ones of two or more ports of the network device.

Figure 1:
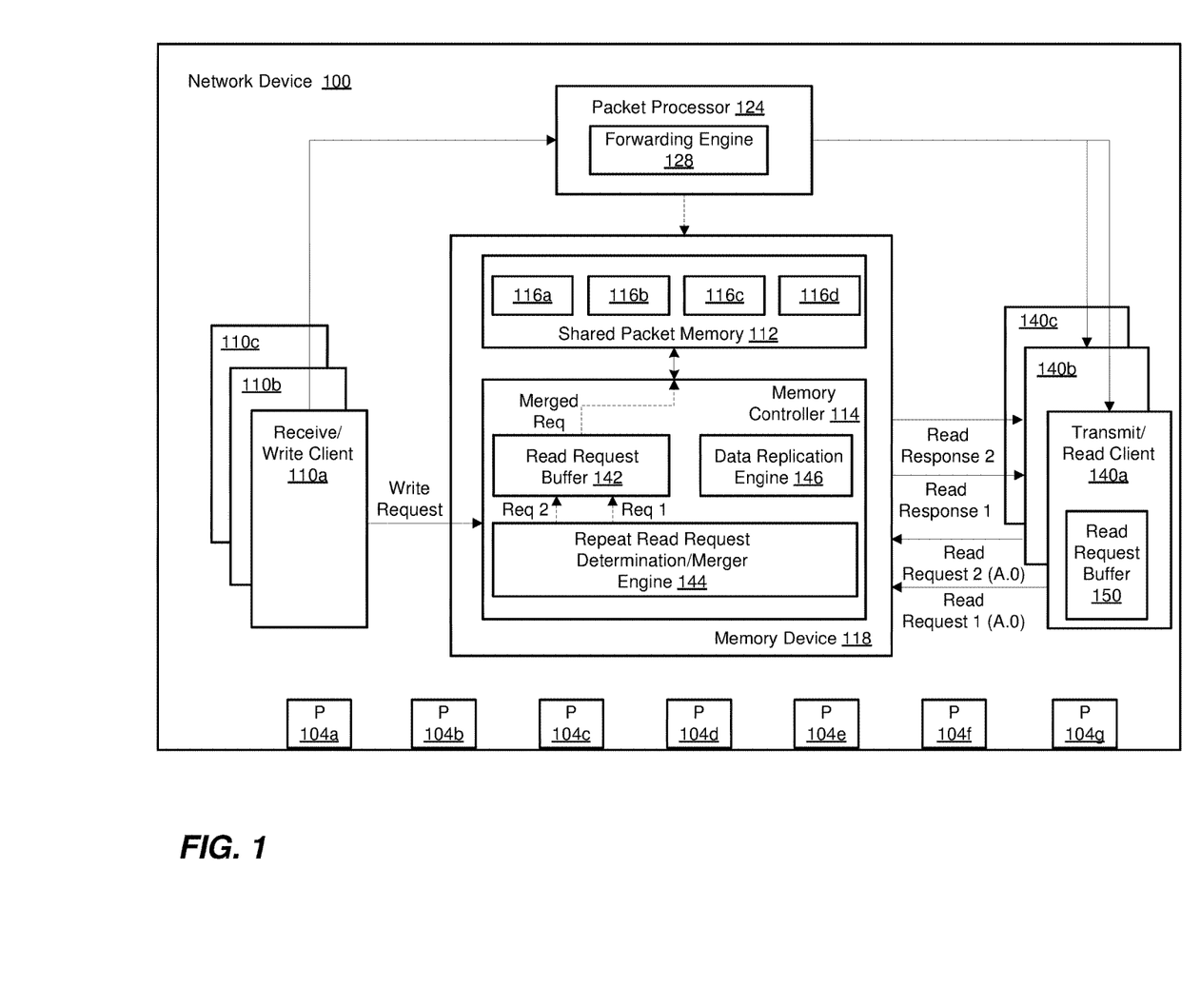
FIG. 1 is a block diagram of an example network device configured to read packet data corresponding to an MC packet a single time for transmission of multiple instances of the MC packet, according to an embodiment.

FIG. 1 is a block diagram of an example network device 100 configured to utilize a read request merging technique, according to an embodiment. The network device 100 includes a plurality of ports 104 communicatively coupled to a plurality of network links (not shown). Although seven ports 104 are illustrated in FIG. 1, the network device 100 includes any suitable number of ports 104 in various embodiments.

A plurality of receive/write client devices (sometimes referred to herein as "write client devices") 110 are coupled to the ports 104. Each receive/write client device 110 is configured to provide a packet that was received via one of the ports 104 to a memory controller device 114 of a memory device 118. The memory controller device 114 is configured to store the packet in a packet memory 112 coupled to or included in the memory device 118. In an embodiment, the packet memory 112 is organized as a plurality of memory banks 116 that can be accessed simultaneously for purposes of improving memory throughput. Although four memory banks 116 are illustrated in FIG. 1, the packet memory 112 includes any suitable number of memory banks 116 in various embodiments. In an embodiment, the packet memory 112 comprises a single memory bank 116.

In an embodiment, the memory banks 116 are shared among the plurality of receive/write client devices 110. In an embodiment, a packet received by any one of the receive/write client devices 110 is written to any one or more of the memory banks 116. Because a packet received by any one of the receive/write client devices 110 is written to any one or more of the memory banks 116, memory space in the packet memory 112 is more efficiently utilized as compared to systems in which a dedicated memory space is assigned to each of a plurality of receive/write client devices, in at least some embodiments.

In an embodiment, each receive/write client 110 stores a packet in the packet memory 112. In an embodiment, each receive/write client 110 stores a packet in the packet memory 112 following arrival of the packet and initial processing, such as for example parsing header information from a header of the packet and an initial determination whether the packet is a unicast packet or a multicast packet that needs to be transmitted to two or more destinations. In another embodiment, parsing header information from a header of the packet and an initial determination whether the packet is a unicast packet or a multicast packet that needs to be transmitted to two or more destinations is performed while the packet is stored in the packet memory 112. In some embodiments in which the packet memory 112 includes multiple banks 116, relatively short packets are stored in a single memory bank 116 whereas relatively long packets are stored across multiple ones of the memory banks 116. As merely an illustrative example, a packet less than or equal to 128 bytes is stored in a single memory bank 116; a packet greater 128 bytes and less than or equal to 256 bytes is stored across two memory banks 116; a packet greater 256 bytes and less than or equal to 384 bytes is stored across three memory banks 116; etc. In other embodiments, packets are written to the different memory banks 116 according to any other suitable convention. In an embodiment, each receive/write client 110 is configured to issue one or more write request to the memory device 118 to cause a packet, or portions of a packet, to be stored in one or more memory banks 116 of the packet memory 112. In an embodiment, each receive/write client 110 is configured to partition a relatively long packet that is to be stored across multiple banks 116, and to issue respective write requests for respective portions of the packet to the memory device 118. In another embodiment, each receive/write client 110 is configured to issue a single write request to write a relatively long packet to the memory device 118, and the memory device 118 is configured to partition the relatively long packet and to store the relatively long packet across multiple banks 116.

Additionally, a packet descriptor associated with a packet to be processed is generated for each packet, in an embodiment. For example, each receive/write client device 110 is configured to generate a packet descriptor associated with a packet to be processed, in an embodiment. In other embodiments, another suitable device or module within the network device 100 is configured to generate a packet descriptor associated with a packet to be processed. The packet descriptor contains information that a packet processor 124 utilizes to process the associated packet. In some embodiments, the packet descriptor includes an address, a pointer, or other suitable indicator of a location in the packet memory 112 at which the associated packet is stored. In some embodiments, the receive/write client device 110 determines the location in the packet memory 112 at which the associated packet is to be stored. In some embodiments, the indicator of the location in the packet memory 112 at which the associated packet is stored is received from the packet memory 112 in response to a write request. In some embodiments in which portions of a packet are stored across different memory banks 116 in the packet memory 112, the portions of the packet are linked together via a linked list in which a location that stores a portion of the packet also includes an indicator of a location that stores a following portion of the packet. In this embodiment, the packet descriptor includes an indicator of a location at which an initial portion of the packet is stored in the packet memory 112. In another embodiment, a data structure separate from the packet memory 112 (e.g., stored in a memory separate from the packet memory 112, such as a local memory included in the memory controller device 114) is used to maintain a linked list corresponding to a packet. In this embodiment, and entry of the linked list stored in the separate data structure includes an indicator of (e.g. a pointer to) a memory location in the packet memory 112 at which a certain portion (e.g., an initial portion, a subsequent portion, etc.) of the packet is stored in the packet memory 112 and also includes a pointer to a next entry in the linked list that includes an includes an indicator of (e.g. a pointer to) a memory location in the packet memory 112 at which a following portion of the packet is stored in the packet memory 112. The packet descriptor includes an indicator of an entry in the separate data structure that points to a memory location at which an initial portion of the packet is stored in the packet memory 112, in this embodiment.

In some embodiments, ones of the receive/write client devices 110 comprise a direct memory access (DMA) device configured to write to the packet memory 112 packets that were received via one or more ports 104. Although three receive/write client devices 110 are illustrated in FIG. 1, the network device 100 may include any suitable number of receive/write client devices 110 in various embodiments.

As discussed above, packet descriptors are provided to the packet processor 124. In some embodiments, the receive/write client devices 110 are configured to provide packet headers or portions of packet headers to the packet processor 124. The packet processor 124 is configured to process a packet descriptor (and in some cases header information not included in the descriptor) to determine one or more of the ports 104 to which the packet associated with the packet descriptor (or header information) is to be forwarded. In an embodiment, the packet processor 124 includes, or is coupled to, a forwarding database 128 that stores forwarding information (e.g., port information) associated with addresses (e.g., media access control (MAC) addresses, Internet Protocol (IP) addresses, etc.) and/or other suitable information. In some embodiments, the forwarding database is configured as or coupled to an engine that is disposed within a packet processing pipeline of the packet processor 124. Alternatively, in some embodiments, the forwarding database 128 is configured as or is coupled to a dedicated accelerator device that is external to one or more packet processing engines within the packet processor 124. In an embodiment, the packet processor 124 is configured to utilize information in the packet descriptor (and/or in some cases header information not included in the descriptor) to look up information in the forwarding database 128 that indicates one or more ports 104 to which an associated packet is to be forwarded. In some embodiments, the processor 124 is configured to store in the packet descriptor an indication(s) of the one or more ports 104 to which the associated packet is to be forwarded.

The packet processor 124 is configured to determine whether a packet is a unicast (UC) packet to be forwarded to a single port or a multicast (MC) packet to be forwarded to more than a single port, and store a suitable indication of whether the packet is a UC packet or an MC packet in the associated descriptor, in an embodiment. In another embodiment, this determination is made by a receive/write client device 110 prior to transfer of the header to the packet processor 124. In any event, this determination is made, in an embodiment, based at least in part on processing information (e.g., address information or other suitable information) in the packet descriptor (and/or in some cases information not included in the descriptor), in an embodiment, such as, for example, a particular port at which the packet is received. In some embodiments, a unicast packet is a subtype of a multicast packet, where a packet of the unicast subtype is to be forwarded (or "fanned out") to only a single port (e.g., fan-out of 1).

In some embodiments, the packet processor 124 is configured to perform other operations in addition to i) determining the port or ports to which a packet is to be forwarded, and ii) determining whether a packet is a UC packet or a MC packet. For example, in some embodiments, the packet processor 124 is configured to determine whether to and/or how to modify a header of an associated packet stored in the packet memory 112 before the associated packet is forwarded to a destination, in an embodiment. For example, in some scenarios, the packet processor 124 causes a header of the packet to be modified, e.g., to change a next hop address, to add an encapsulating header, to remove an encapsulating header, etc. For example, in an embodiment, the packet processor 124 may modify the associated descriptor to indicate to another device or module of the network device (e.g., a header alteration unit (not shown)) whether to or how to modify a header.

Packet descriptors processed by the packet processor 124 are provided to a plurality of transmit/read client devices (sometimes referred to herein as "read client devices") 140. Each read client device 140 is configured to utilize a location indicator in a packet descriptor to read data corresponding to the associated packet from the packet memory 112. In an embodiment, in which a packet is partitioned into multiple portions, each read client device 140 is configured to read data corresponding to each portion of the packet, and to assemble the data to generate a transmit packet that is to be transmitted to a destination via an egress port. The read client device 140 then provides the packet to a port 104, indicated by the associated packet descriptor, for transmission via the port 104 which is operating as an egress port.

For a unicast packet, the packet, or each portion of a partitioned packet, is read once from the packet memory 112 and transmitted via the appropriate port 104 as determined from processing the descriptor, in an embodiment. Thus, in an embodiment, a single read client device 140 issues a single read request to the memory device 118 to request the packet, or a portion of the packet, to be read from the packet memory 112. In contrast, an MC packet needs to be forwarded multiple times, and in some scenarios tens or even hundreds or thousands of times, to multiple destinations via multiple ports. Accordingly, in an embodiment, each of one or more of the read client devices 140 issues respective one or more read requests to the memory device 118 to read packet data for respective ones of multiple instances of the packet to be forwarded to different ports 104 coupled to the one or more read client devices 140. In conventional systems, each of the read requests issued by one or more read client devices 140 is serviced individually and, accordingly, packet data is read from the packet memory 112 for each instance of the MC packet. Moreover, the packet data is read multiple times from a same memory location in the packet memory 112, such as from a same memory bank 116 of the packet memory 112. As a result, because packet data from MC packets is read multiple times from a same memory location in a same memory banks 116, in conventional systems, MC packets experience a significantly greater statistical latency as compared to UC packets that are read from memory locations that are statistically distributed among different memory banks 116.

In embodiments described herein, the memory controller device 114 of the memory device 118 is configured to determine that multiple pending read requests are to read packet data from a particular memory location in the packet memory 112 and, in response to determining that multiple pending read requests are to read packet data from a particular memory location in the packet memory 112, read packet data a single time from the particular memory location in the packet memory 112. In an embodiment, for example, the memory controller device 114 stores received read requests in a read request buffer 142 until the packet memory 112 (e.g., particular memory banks 116 to which respective read requests are directed) is available for servicing the read requests. When the memory controller device 114 receives a read request to read packet data from a particular memory location in the packet memory 112, a repeat read request determination/merger engine 144 included in the memory controller device 114 searches the read request buffer 142 to find an entry that represents one or more other pending read requests to read packet data from the particular memory location in the packet memory 112. If the repeat read request determination/merger engine 144 does not find an entry that represents one or more currently pending read requests to read packet data from the particular memory location in the packet memory 112, then the repeat read request determination engine 144 saves the read request as a new entry in the read request buffer 142. On the other hand, if the repeat read request determination/merger engine 144 finds an entry that represents one or more currently pending read requests to read packet data from the particular memory location in the packet memory 112, the repeat read request determination/merger engine 144 merges the received read request with the one or more currently pending reads requests. For example, instead of saving the received read request as a new entry in the read request buffer 142, the repeat read request determination/merger engine 144 updates the entry that represents the one or more currently pending read requests to read packet data from the particular memory location in the packet memory 112 to indicate the additional received read request to read packet data from the particular memory location in the packet memory 112. Subsequently, when the shared packet memory 112 becomes available to service the read request to read packet data from the particular memory location in the packet memory 112, the memory controller device 114 reads packet data a single time from the particular memory location in the packet memory 112. In an embodiment, when the memory controller device 114 reads the packet data a single time from the particular memory location in the packet memory 112, a data replication engine 146 included in the memory controller device 114 replicates the packet data to generate multiple instances of the packet data. The memory controller 114 then provides respective ones of the multiple instances of the packet data to one or more read client devices 140 from which the read requests represented by the entry in the read request buffer 142 were received, in an embodiment.

As an example, in the embodiment illustrated in FIG. 1, the memory controller device 114 receives, from a first client device 140 (e.g., 140a), a first read request to read packet data from a particular address (e.g., A.0) in the packet memory 112. The repeat read request determination/merger engine 144 of the memory controller device 114 searches the read request buffer 142 for an entry corresponding to the particular address A.0. The repeat read request determination/merger engine 144 does not find, in the read request buffer 142, an entry corresponding to the address A.0, in an embodiment. Accordingly, the repeat read request determination/merger engine 144 stores the read request as a new entry in the read request buffer 142, and includes, in the new entry in the read request buffer 142, an indication of the read client device 140a from which the read request was received, in an embodiment. Subsequently, while the first read request is still pending in the read request buffer 142, the memory controller device 114 receives, from a second transit client device 140b, a second read request to read packet data from the particular memory location (e.g., A.0) in the packet memory 112. The repeat read request determination/merger engine 144 searches the read request buffer 142 for an entry corresponding to the particular address A.0 indicated in the second read request received from the second read client device 140b. Because the first read request received from the first read client device 140a is currently pending in the read request buffer 142, the repeat read request determination/merger engine 144 finds, in the read request buffer 142, the entry corresponding to the particular address A.0. Accordingly, the repeat read request determination/merger engine 144 merges the second read request received from the second read client device 140b with the first read request received from the first client device 140a, in an embodiment. For example, the repeat read request determination/merger engine 144 updates the entry, in the read request buffer 142, corresponding to the address A.0 to further include an indication of the second read client device 140b from which the second read request was received, in an embodiment.

Continuing with the embodiment illustrated in FIG. 1, when the packet memory 112 becomes available for reading data from the address A.0, the memory controller device 114 reads the packet data a single time from the address A.0. The data read from the address A.0 is replicated by the data replication engine 146, in an embodiment. For example, because the entry in the read request buffer 142 indicated that two read requests to read packet data from the address A.0 were received by the memory controller device 114, the packet data replication engine 146 replicates the packet data read from the address A.0 to generate two copies of the packet data, in an embodiment. The memory controller device 114 provides respective ones of the two copies generated by the data replication engine 146 to respective ones of the read client devices 140 from which the read requests were received by the memory controller device 144, as was indicated in the entry, corresponding to the address A.0, in the read buffer request 142. Thus, the memory controller device 114 provides a first instance of the packet data read from the address A.0 to the first read client device 140a from which the first read request to read packet data from the address A.0 was received by the memory controller device 114, and provides a second instance of the packet data read from the address A.0 to the first read client device 140b from which the second read request to read packet data from the address A.0 was received by the memory controller device 144, in the illustrated embodiment. Accordingly, packet data that was read only one time from address A.0 in the packet memory 112 is provided to each one of the multiple read client devices 140 from which respective requests to read the packet data were received by the memory controller 114, in an embodiment.

Referring still to FIG. 1, in an embodiment, each read client device 140 is configured to implement its own read request merging technique such that if the read client device 140 has issued a read request to the memory device 118 to read packet data from a particular location in the packet memory 112 but has not yet received the packet data from the memory device 118, the read client device 140 will not issue additional read requests to read packet data from the particular location in the packet memory 112. For example, in an embodiment, respective ones of the read client devices 140 each includes a read request buffer 150 configured to store pending read requests that have been issued by the read client device 140. When issuing a read request to read packet data from a particular memory location in the packet memory 112, a read client device 140 searches its read request buffer 150 for a pending read request to read packet data from the particular memory location in the packet memory 112. If a match is found, then the read client device 140 does not issue a new read request. Instead, in an embodiment, the read client device 140 updates the pending read request in the read request buffer 150 to indicate the port 104 to which the corresponding instance of the packet (e.g., MC packet) is to be forwarded. Subsequently, when the read client device 140 receives the packet data from the memory device 118, the read client 140 replicates the packet data to generate multiple instances of the packet data for forwarding the multiple instances of the packet data to multiple ports 104, such as all ports 104 coupled to the read client device 140, or those ports 104 that are indicated in the corresponding entry in the read request buffer 150.

Figure 2:
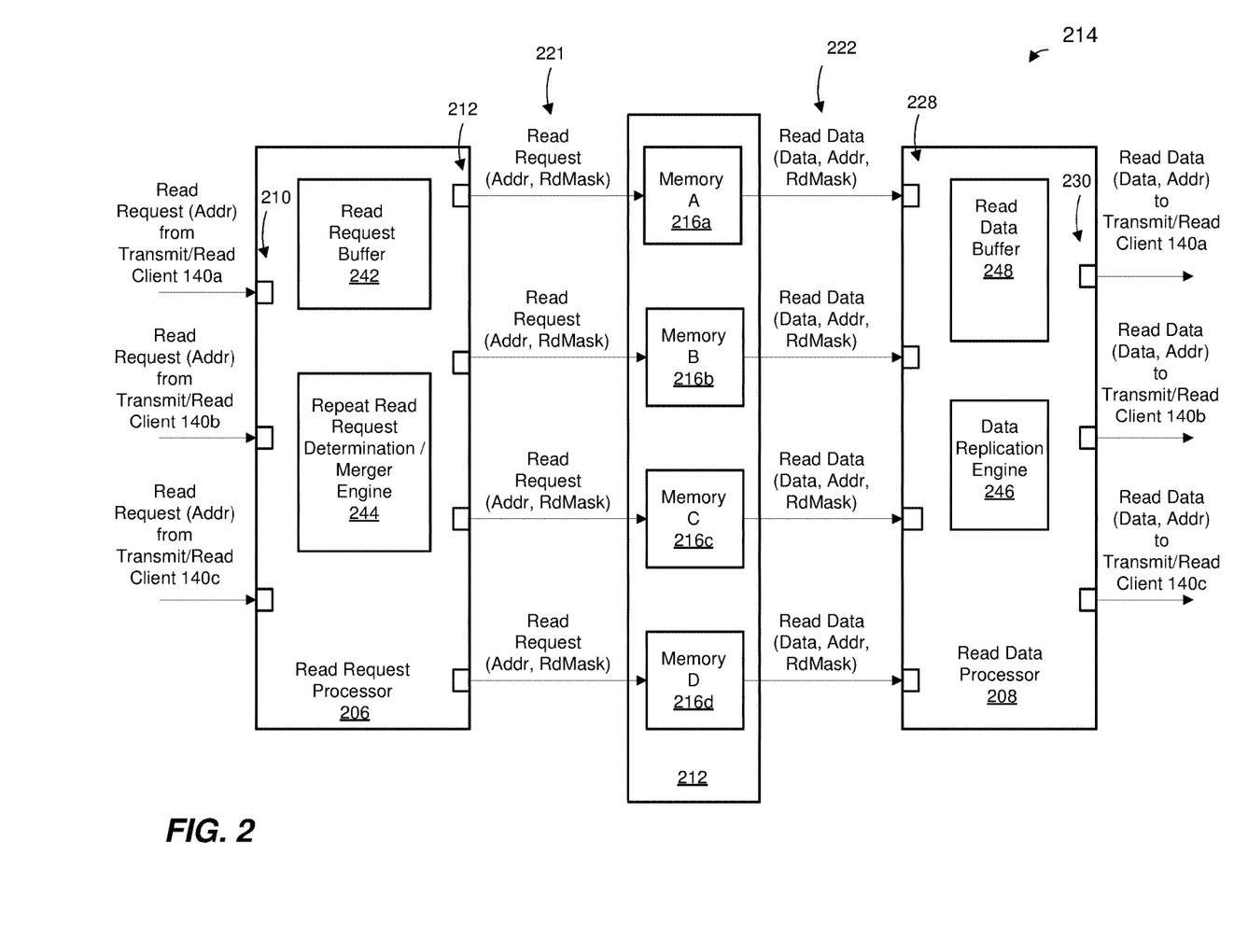
FIG. 2 is a block diagram of an example memory controller device utilized with the network device of FIG. 1, according to an embodiment.

FIG. 2 is a block diagram of an example memory controller device 214 utilized with the network device 100 of FIG. 1, according to an embodiment. In an embodiment, the memory controller device 214 corresponds to the memory controller device 114 of the network device 100 of FIG. 1, in an embodiment. In other embodiments, the memory controller device 214 is utilized in a suitable device different from the network device 100 of FIG. 1. Similarly, the network device 100 of FIG. 1 utilizes a suitable memory controller device different from the memory controller device 214, in some embodiments. Merely for ease of explanation, the memory controller device 214 is described below with reference to FIG. 1.

The memory controller device 214 is coupled to a packet memory 212, in an embodiment. The packet memory 212 includes a plurality of memory banks 216 including a memory bank A 2216a, a memory bank B 2216b, a memory bank C 216c and a memory bank D 216d. The packet memory 212 corresponds to the packet memory 112 of FIG. 1, and the memory banks 216 correspond to the memory banks 116 of FIG. 1, in an embodiment. Although the packet memory 212 is illustrated in FIG. 2 as having four memory banks 216, the packet memory 212 includes other suitable numbers (e.g., 1, 2, 3, 5, 6, etc.) of memory banks 216, in other embodiments.

With continued reference to FIG. 2, the memory controller device 214 includes a read request processor 206 and a read packet data processor 208, in an embodiment. The read request processor 206 includes a plurality of input interfaces 210 configured to couple the read request processor 206 to a plurality of read client devices such as the read client devices 140 of FIG. 1. The read request processor 206 also includes a plurality of output interfaces 212 configured to couple the read request processor 206 to a plurality memory banks such as the memory banks 216. Although the read request processor 206 is illustrated as including three input interfaces 210 for coupling to three read client devices 140 and four output interfaces 212 for coupling to four memory banks 216, the read request processor 206 includes other suitable numbers of input interfaces 210 for coupling to corresponding other suitable numbers of read client devices 140 and/or includes other suitable numbers of output interfaces 211 for coupling to corresponding other suitable numbers of memory banks 216, in other embodiments.

In an embodiment, the read request processor 206 includes a read request buffer 242 and a repeat read request determination/merger engine 244. The read request buffer 242 corresponds to the read request buffer 141 of FIG. 1, and the read request determination/merger engine 244 corresponds to the read request determination/merger engine 144 of FIG. 1, in an embodiment. The read request buffer 242 is configured to store read requests received by the memory controller device 214 but not yet serviced by the memory controller device 214. For example, in an embodiment, the read request processor 206 is unable to service at least some read requests immediately upon receiving the read requests because memory banks 216 addressed by the read requests are being accessed on behalf of other (e.g., previously received) read requests. The read request processor 206 stores such read requests in the read request buffer 242, in an embodiment. When a memory bank 216 becomes available for servicing a read request, the read request processor 206 retrieves a pending read request addressed to the memory bank 216 and forwards the pending request to the memory bank 216 via a corresponding output interface 212, in an embodiment.

In an embodiment, when the read request processor 206 receives a read request to read packet data from a particular memory location in the packet memory 202, the repeat read request determination/merger engine 244 searches the read request buffer 242 for an entry corresponding to the particular memory location. If the repeat read request determination/merger engine 244 finds, in the read request buffer 242, an entry corresponding to the particular memory location, the repeat read request determination/merger engine 244 updates the entry to indicate the read client device 140 from which the read request was received, thereby merging the read request with the read request in the buffer 242. For example, in an embodiment, the entry in the read request buffer 242 includes a bitmap mask with each bit in the mask corresponding to a particular client device 140, and the repeat read request determination/merger engine 244 updates the entry by setting (e.g., to a logic 1) the bit in the bitmap mask that corresponds to the client device 140 from which the read request was received, in an embodiment.

Figure 3A:
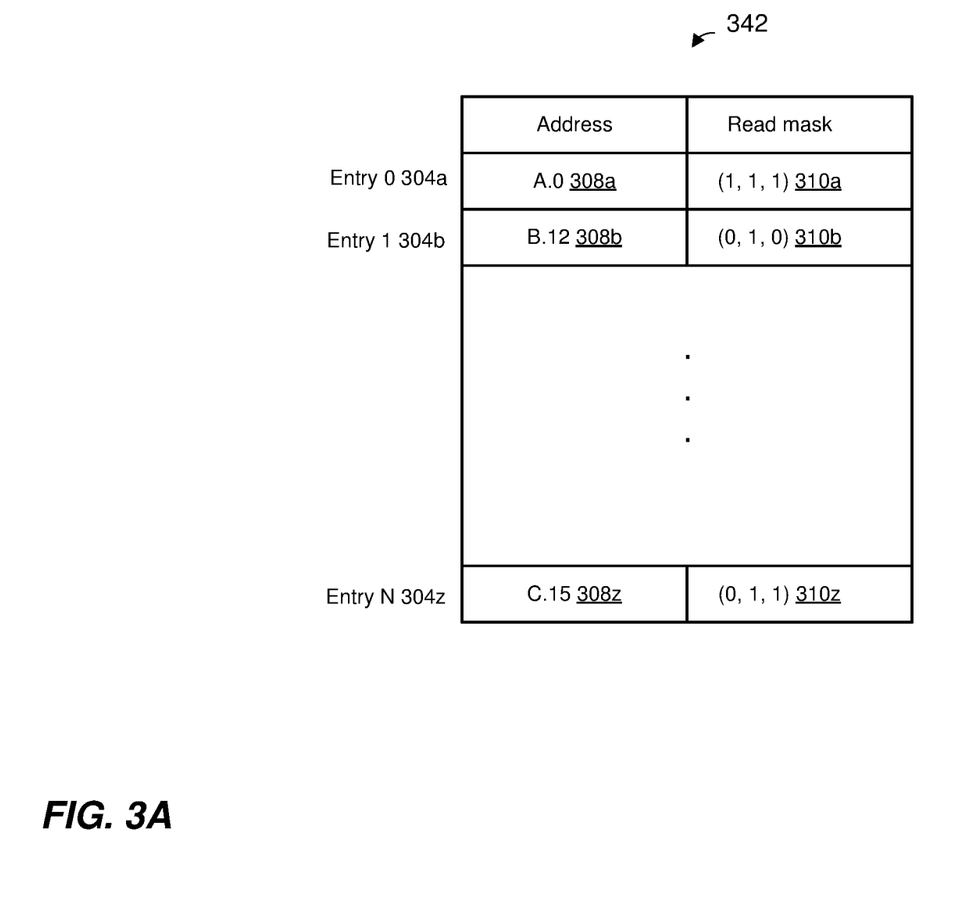
FIG. 3A is a block diagram of a read request buffer utilized with the memory controller device of FIG. 2, according to an embodiment.

Referring briefly to FIG. 3A, an example read request buffer 342 corresponds to the read request buffer 242 of the memory controller device 214 of FIG. 2, according to an embodiment. In other embodiments, the read request buffer 342 is utilized with suitable memory devices different from the memory controller device 214 of FIG. 2. Similarly, the memory controller device 214 utilizes a suitable read request buffer different from the read request buffer 342, in an embodiment. For ease of explanation, the read request buffer 342 of FIG. 3A is described below with reference to FIG. 2.

The read request buffer 342 includes a plurality of entries 304. Each entry 304 includes a first field 308 to store an indication of a location (e.g., an address) in the packet memory 202 to which the entry 304 corresponds, in an embodiment. Additionally, each entry 304 includes a second field 310 to store indications of read client device 140 from which read requests for reading data from the memory location indicated by the first field 308. In an embodiment, the second field 310 of an entry 304 stores a bitmap, where each bit in the bitmap corresponds to a read client device 140. Thus, for example, in the embodiment illustrated in FIG. 3A, a bitmap mask stored a second field 310 includes three bits corresponding to three read client devices 140 with which the memory controller device 214 is configured to operate. In other embodiments, a bitmap mask stored a second field 310 includes other suitable numbers of bits corresponding to other suitable numbers of read client devices 140 with which the memory controller device 214 is configured to operate.

In the embodiment of FIG. 3A, the field 308a of the entry 304a indicates that the entry 304a corresponds to an address A.0 (e.g., address 0 in the memory bank A 216a), and the second field 310a of the entry 304a indicates that respective read requests to read packet data from the address A.0 were received from each of the read client device 140a, the read client device 140b and the read client device 140c. Continuing with the embodiment illustrated in FIG. 3A, the field 308b of the entry 304b indicates that the entry 304b corresponds to an address B.12 (e.g., address 12 in the memory bank B 216b), and the second field 310b of the entry 304b indicates that a read request to read packet data from the address B.12 was received from the client read device 140b, and not received from the read client device 140a and the read client device 140c. Similarly, the first field 308z of the entry 304z indicates that the entry 304z corresponds to an address C.15 (e.g., address 15 in the memory bank C 216c), and the second field 310z of the entry 304z indicates that respective read requests to read packet data from the address C.15 were received from each of the transmit/read client devices 140b and the transmit/read client device 140c, and not received from the transmit/read client read device 140a, in the illustrated embodiment.

Referring back to FIG. 2, in an embodiment, when the read request processor 206 schedules a read request to be serviced (e.g., when a memory bank 216 to which the read request is addressed becomes available for servicing the read request), the read request processor 206 forwards a memory read request 221 to the packet memory 202. In an embodiment, the memory read request 221 includes the contents of the entry in which the corresponding read request was stored in the read request buffer 242. Thus, for example, in an embodiment, the memory request 221 includes the memory location (e.g., the address) in the memory 112 from which the data is to be read, and the indications of the transmit/read client devices 140 to which the data read from the address in the packet memory 202 is to be forwarded.

The requested packet data is read from the packet memory 202, and a memory response 222 is generated and provided to the read data processor 208, in an embodiment. The memory response 222 includes the read packet data, an indication of the memory location (e.g., the address) from which the packet data was read, and indications (e.g., the bitmap mask) of the transmit/read client devices 140 to which the packet data is to be provided, in an embodiment. The indication of the memory location (e.g., the address) from which the data was read, and indications (e.g., the bitmap mask) of the transmit/read client devices 140 to which the data is to be forwarded are copied to the memory response 222 from the corresponding memory request 221, in an embodiment.

The read data processor 208 includes a read data buffer 248 and a data replication engine 246, in an embodiment. The data replication engine 246 corresponds to the data replication engine 146 of FIG. 1, in an embodiment. The read data processor 208 also includes a plurality of input interfaces 228 configured to couple the read data processor 208 to a plurality memory banks such as the memory banks 216. The read data processor 208 also includes a plurality of output interfaces 230 configured to couple the read data processor 208 to the plurality of transmit/read client devices 140. Although the read data processor 208 is illustrated as including four input interfaces 228 for coupling to four memory banks 216 and three output interfaces 230 for coupling to three transmit/read client devices 140, the read data processor 208 includes other suitable numbers of input interfaces 228 for coupling to corresponding other suitable numbers of memory banks 216 and/or includes other suitable numbers of output interfaces 230 for coupling to corresponding other suitable numbers of transmit/read client devices 140, in other embodiments.

Figure 3B:
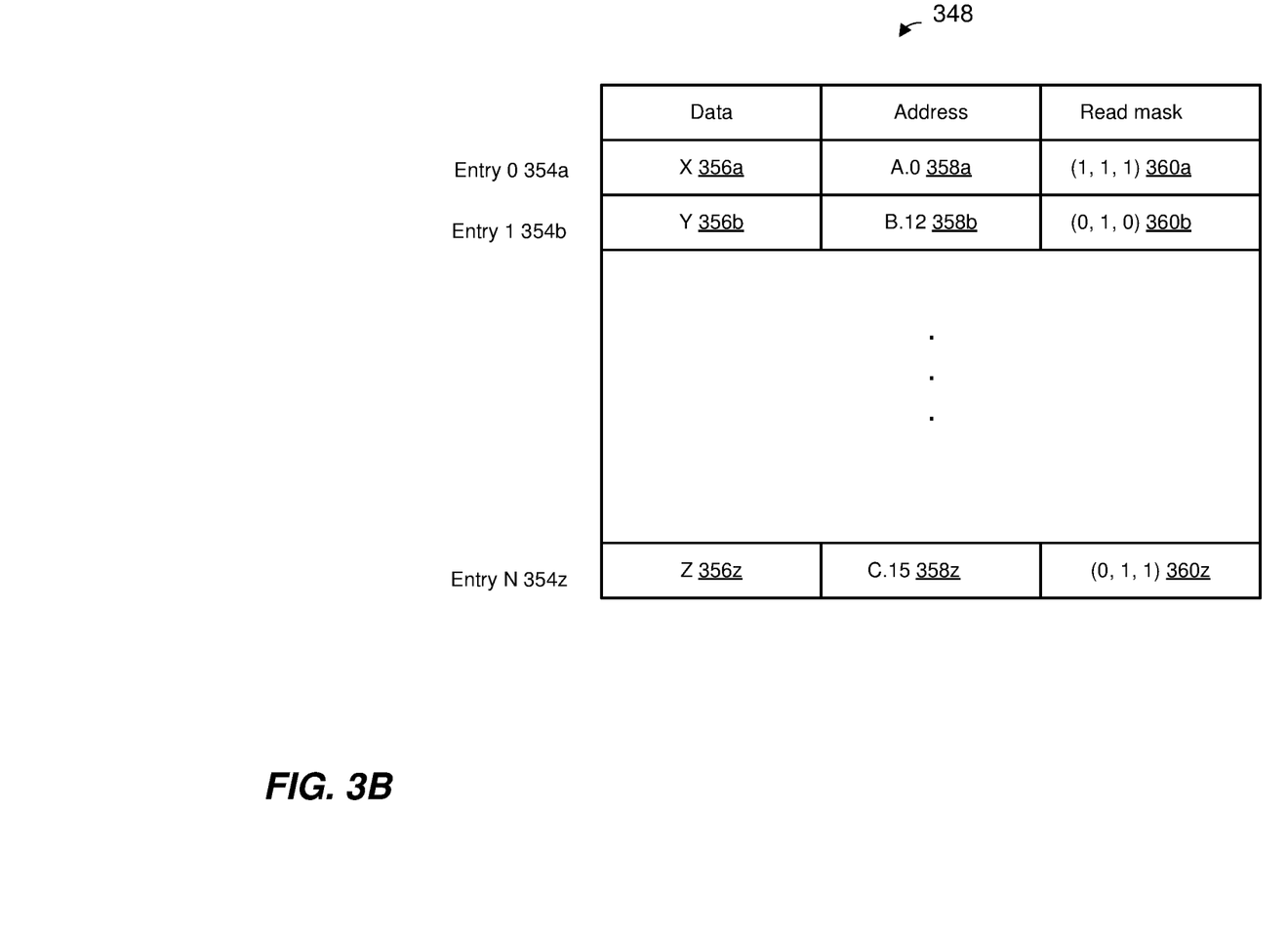
FIG. 3B is a block diagram of a read data buffer utilized with the memory controller device of FIG. 2, according to an embodiment.

In an embodiment, the read data processor 208 is configured to receive the memory response 222 and to initially store a received memory response 222 in the read data buffer 248, in an embodiment. Referring briefly to FIG. 3B, an example read data buffer 348 corresponds to the read data buffer 248 of the memory controller device 214 of FIG. 2, according to an embodiment. In other embodiments, the read data buffer 350 is utilized with suitable memory devices different from the memory controller device 214 of FIG. 2. Similarly, the memory controller device 214 utilizes a suitable read data buffer different from the read data buffer 348, in an embodiment. For ease of explanation, the read data buffer 348 of FIG. 3B is described below with reference to FIG. 2.

The read data buffer 348 is generally similar to the read request buffer 342 of FIG. 3A, in an embodiment. The read data buffer 348 includes a plurality of entries 354 corresponding to the plurality of entries 304 of the read request buffer 342, in an embodiment. In an embodiment, each entry 354 includes a first field 356 for storing data read from a memory location in the packet memory 202, and a second field 358 to store an indication (e.g., an address) of the memory location in the packet memory 202 from which the data stored in the first portion 356 was read. Additionally, each entry 354 includes a third field 360 to store indications of client device 140 to which the data stored in the first field 356 is to be provided.

Referring again to FIG. 2, in an embodiment, the data replication engine 246 is configured to replicate the data stored in an entry the read data buffer 248 to generate multiple instances of the data. The read processor 208 is configured to provide respective ones of the multiple instances of the data to respective client device 140 from which read requests to read the data were received by the memory controller device 214, in an embodiment. In an embodiment, the data replication engine 246 is configured to generate a number of instances of the data stored in a first field of an entry in the read data buffer 248 that corresponds to the number of transmit/read client devices 140 to which the data is to be provided as indicated in a third field of the entry in the read data buffer 248. The read data processor 208 is configured to provide the respective instances of the data generated by the data replication engine 246 to the respective transmit/read client devices 140 indicated in the third field of the entry in the read data buffer 248.

Figure 4:
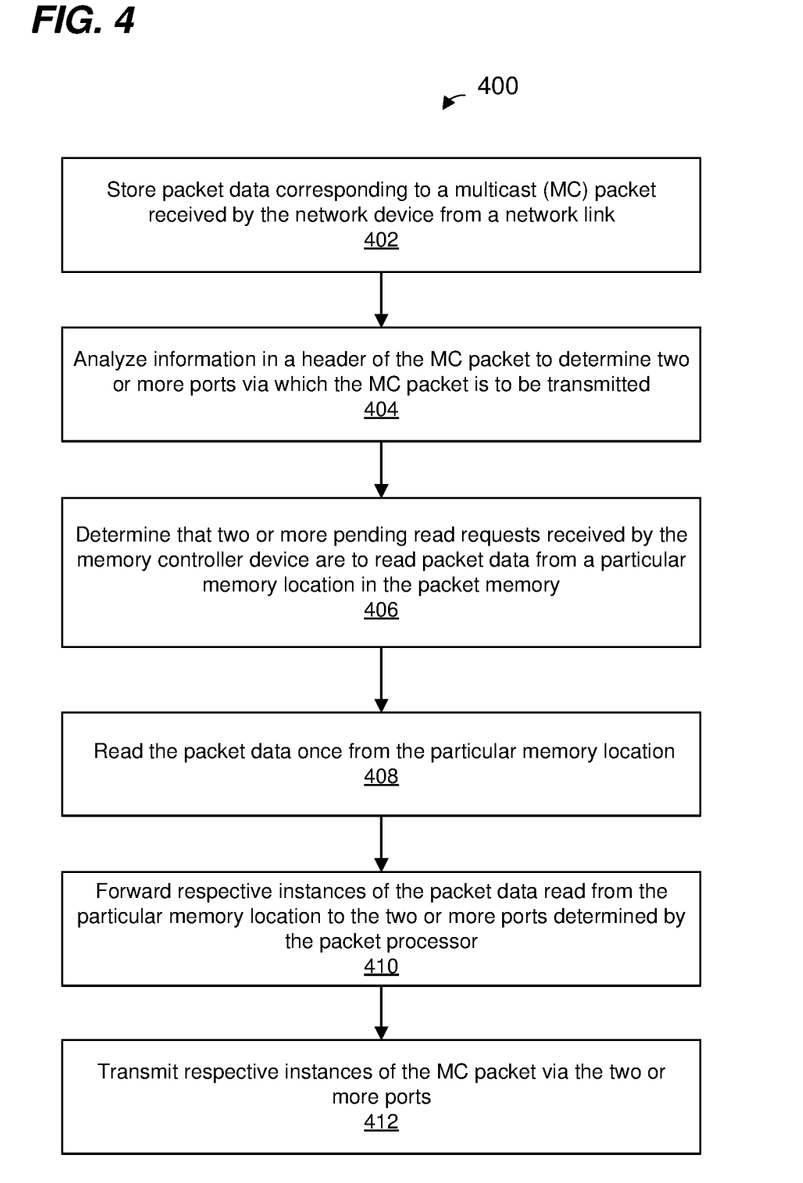
FIG. 4 is a flow diagram illustrating an example method for reading data corresponding to MC packets from a packet memory, according to an embodiment.

FIG. 4 is a flow diagram illustrating an example method 400 for reading data corresponding to MC packets from a packet memory, according to an embodiment. In an embodiment, the network device 100 of FIG. 1 implements the method 400 to read data corresponding to MC packets from the packet memory 112. In an embodiment, the memory controller device 214 of FIG. 2 implements portions of the method 400 to read data corresponding to an MC packet from the packet memory 202. In other embodiments, the method 400 is implemented by another suitable network device and/or memory device.

At block 402, packet data corresponding to an MC packet is stored in a packet memory. For example, the packet data is stored at a memory location in the packet memory 112 of FIG. 1. In another embodiment, the packet data is stored at a memory location in the packet memory 202 of FIG. 2. In other embodiments, the packet data is stored in suitable packet memories different from the packet memory 112 of FIG. 1 and the packet memory 202 of FIG. 2.

At block 404, two or more ports via which the MC packet is to be transmitted from the network device are determined. For example, the packet processor 124 of FIG. 1 determines the two or more ports via which the MC packet is to be transmitted from the network device, in an embodiment. In an embodiment, the packet processor 124 analyzes a header of the MC packet to determine the two or more ports via which the MC packet is to be transmitted from the network device. In other embodiments, the two or more ports via which the MC packet is to be transmitted from the network device are determined by suitable processors different from the packet processor 124 and/or based on information other than a header of the MC packet.

At block 406, it is determined that two or more pending read requests are to read data from a same particular memory location at which the packet data is stored in the packet memory. In an embodiment, a memory controller device determines that two or more pending read requests are to read data from the particular memory location at which the packet data is stored in the packet memory. For example, the memory controller device 114 (e.g., the repeat read request determination/merger engine 144) of FIG. 1 determines that two or more pending read requests are to read data from the particular memory location at which the packet data is stored in the packet memory, in an embodiment. In another embodiment, the memory controller device 214 (e.g., the repeat read request determination/merger engine 244) of FIG. 2 determines that two or more pending read requests are to read data from the particular memory location at which the packet data is stored in the packet memory. In an embodiment, the two or more pending read requests are received by the memory controller device from respective ones of multiple read clients coupled to the memory controller device. In an embodiment, the memory controller device determines that two or more pending read requests are to read data from the particular memory location at which the packet data is stored in the packet memory, when a particular one of the two or more read requests is received, by searching a read request buffer and determining that an entry corresponding to the particular memory location already exists in the read request buffer. In other embodiments, the memory controller device determines that two or more pending read requests are to read data from the particular memory location at which the packet data is stored in the packet memory in other suitable manners.

At block 408, the packet data is read a single time from the particular memory location in the packet memory. In an embodiment, a memory controller device reads the data a single time from the particular memory location in the packet memory. For example, the memory controller device 118 of FIG. 1 reads the data a single time from the particular memory location in the packet memory 112, in an embodiment. In another embodiment, the memory controller device 214 of FIG. 2 reads the data a single time from the particular memory location in the packet memory 212. In an embodiment, the memory device reads the packet data a single time from the particular memory location in the packet memory to service the two or more read requests, in response to determining at block 406 that the two or more read requests are to read data from the particular memory location in the packet memory. In an embodiment, in response to determining at block 406 that the two or more read requests are to read data from the particular memory location in the packet memory, the memory device merges the two or more read requests into a single read request, and services the single read request by reading the data from the particular memory location when the packet memory 112 becomes available for reading the data from the particular memory location.

At block 410, the data read a single time from the particular memory location in the packet memory at block 408 is forwarded to the two or more ports determined at block 404. In an embodiment, a memory controller device (e.g., the memory controller device 114 of FIG. 1, the memory controller device 214 of FIG. 2 or another suitable memory controller device) forwards the data to one or more client devices (e.g., one or more of the client devices 140 or other suitable client devices) coupled to the two or more ports determined at block 404. In an embodiment, block 410 includes replicating the data read a single time from the particular memory location in the packet memory at block 408 to generate two or more copies of the data respective ones of two or more client devices coupled to respective ones of the two or more ports determined at block 404.

At block 412, respective instances of the MC packet are generated and transmitted via respective ones of the two or more ports determined at block 404. In an embodiment, the respective instances of the MC packet are generated at block 412 using the respective copies of the data read a single time from the packet memory at block 408. In an embodiment, generating an MC packet at block 412 includes combining packet data corresponding to multiple chunks of the MC packet received from the memory controller device. In an embodiment, generating an MC packet includes combining packet data corresponding to one or multiple chunks of the MC packet with header of the packet that has been modified based on processing of the packet by a packet processor (e.g., the packet processor 124 of FIG. 1). In another embodiment, generating an MC packet includes combining packet data corresponding to one or multiple chunks of the MC packet with an unmodified header of the packet.

In an embodiment, a network device comprises a packet memory configured to store packet data corresponding to a multicast (MC) packet received by the network device from a network link. The network device also comprises a packet processor configured to at least to determine two or more ports via which the MC packet is to be transmitted from the network device. The network device additionally comprises a memory controller device coupled to the packet memory, the memory controller device configured to determine that two or more pending read requests received by the memory controller device are to read packet data from a particular memory location in the packet memory; in response to the determining, read the packet data a single time from the particular memory location; and provide respective instances of the packet data read from the particular memory location to respective two or more read client devices for subsequent transmission of the packet data via the two or more ports determined by the packet processor.

In other embodiments, the network device also comprises one of, or any suitable combination of two or more of, the following features.

The memory controller device is further configured to, in response to determining that two or more pending read requests received by the memory controller device are to read packet data from the particular memory location in the packet memory, merge the two or more read requests into a single read request, and service the single read request by reading the packet data a single time from the memory location in the packet memory.

The memory controller device is configured to buffer received read requests in a read request buffer until the packet memory is available for reading packet data from respective memory locations indicated by the respective read requests.

The pending read request buffer includes a plurality of entries having respective first fields to store a memory location indicated by a read request and respective second fields to store indications of client devices from which read requests to read packet data from the memory location indicated in the corresponding first field were received by the memory controller device.

The memory controller device is configured to receive a particular read request of the two or more read requests from a particular read client device of the two or more read client devices.

The memory controller device is configured to search the read request buffer to identify an entry in which the first field matches a particular memory location indicated in the particular read request.

The memory controller device is configured to, in response to identifying the entry in which the first field matches the particular memory location indicated in the particular read request, update the second field of the entry to include an indication of the particular read client device from which the particular read request was received by the memory controller device.

The memory controller device is configured to, after reading the packet data from the particular memory location, replicate the packet data to generate two or more instances of the packet data, and provide respective ones of the two or more instances of the packet data to the respective two or more read client devices.

A read client device of the one or more read client devices is configured to determine that a new read request to be issued to the memory controller device is to read packet data from a particular memory location, in the packet memory, for which i) a previous read request has been issued to the memory controller device and ii) the corresponding packet data has not yet been received from the memory controller device.

The read client device of the one or more read client devices is further configured to, in response to determining that the new read request to be issued to the memory controller device is to read packet data from a particular memory location, in the packet memory, for which i) a previous read request has been issued to the memory controller device and ii) the corresponding packet data has not yet been received from the memory controller device, not issue the new read request to the memory controller device.

The read client device of the one or more read client devices is further configured to receive the packet data from the memory controller device in response to the previous read request.

The read client device of the one or more read client devices is further configured to replicate the packet data to generate multiple instances of the packet data.

The read client device of the one or more read client devices is further configured to forward a first instance of the multiple instances to a first port coupled to the read client device, the first port corresponding to the previous read request.

The read client device of the one or more read client devices is further configured to forward a second instance of the multiple instances to a second port coupled to the read client device, the second port corresponding to the new read request.

A read client device of the two or more read client devices is configured to generate a transmit packet to include i) packet data received from the memory controller device and ii) a header of the packet, and transmit the transmit packet via a port coupled to the read client device.

The packet memory comprises two or more memory banks shared among the two or more read client devices, wherein the two or more memory banks are configured to be accessed simultaneously.

In another embodiment, a method of reading, from a packet memory, data corresponding to multicast packets in a network device, includes storing, at a particular memory location in the packet memory, packet data corresponding to a multicast (MC) packet received by the network device from a network link. The method additionally includes analyzing information in a header of the MC packet to determine two or more ports via which the MC packet is to be transmitted. The method also includes determining, with a memory controller device, that two or more pending read requests are to read packet data from the particular memory location in the packet memory. The method further includes in response to determining that the two or more pending read requests are to read packet data from the particular memory location, reading, with the memory controller device, the packet data a single time from the particular memory location, and providing, with the memory controller device, respective instances of the packet data read from the particular memory location to respective two or more read client devices for subsequent transmission of the packet data via the two or more ports determined by the packet processor.

In other embodiments, the method also includes one of, or any suitable combination of two or more of, the following features.

The method further includes in response to determining that two or more pending read requests received by the memory controller device are to read packet data from the particular memory location in the packet memory, merging the two or more read requests into a single read request, and servicing the single read request by reading the packet data a single time from the memory location in the packet memory.

The method further includes buffering received read requests in a read request buffer until the packet memory is available for reading packet data from respective memory locations indicated by the respective read requests.

Buffering received read requests in a read request buffer comprises buffering the received read requests as a plurality of entries having respective first fields to store a memory location indicated by a read request and respective second fields to store indications of client devices from which read requests to read packet data from the memory location indicated in the corresponding first field were received by the memory controller device.

The method further includes receiving, at the memory controller device, a first read request of the two or more read requests is received from a first read client device.

The method further includes searching, with the memory controller device, the read request buffer to identify an entry in which the first field matches the particular memory location indicated in the first read request.

The method further includes, in response to identifying the entry in which the first field matches the particular memory location indicated in the first read request, updating, with the memory controller device, the second field of the entry to include an indication of the first read client device from which the first read request was received by the memory controller device.

The method further includes after reading the packet data from the particular memory location, replicating, with the memory controller device, the packet data to generate two or more instances of the packet data.

Providing the packet data read from the particular memory location to respective two or more read client devices comprises providing respective ones of the two or more instances of the packet data to the respective two or more read client devices.

The method further includes determining that a new read request to be issued to the memory controller device is to read packet data from a particular memory location, in the packet memory, for which i) a previous read request has been issued to the memory controller device and ii) the corresponding packet data has not yet been received from the memory controller device in response to determining that the new read request to be issued to the memory controller device is to read packet data from a particular memory location, in the packet memory, for which i) a previous read request has been issued to the memory controller device and ii) the corresponding packet data has not yet been received from the memory controller device, not issuing the new read request to the memory controller device.

The method further includes receiving the packet data from the memory controller device in response to the previous read request.

The method further includes replicating the packet data to generate multiple instances of the packet data.

The method further includes forwarding a first instance of the multiple instances to a first port coupled to the read client device, the first port corresponding to the previous read request.

The method further includes forwarding a second instance of the multiple instances to a second port coupled to the read client device, the second port corresponding to the new read request.

The method further includes generating, at a read client device of the two or more read client device, a transmit packet to include that packet data received by the read client device from the memory controller device.

The method further includes transmitting the transmit packet via a port coupled to the read client device.

The packet memory comprises two or more memory banks shared among the two or more read client devices.

The method further includes servicing multiple read requests by simultaneously accessing the two or more read client devices.

At least some of the various blocks, operations, and techniques described above may be implemented utilizing hardware, a processor executing firmware instructions, a processor executing software instructions, or any combination thereof.

When implemented in hardware, the hardware may comprise one or more of discrete components, an integrated circuit, an application-specific integrated circuit (ASIC), a programmable logic device (PLD), etc.

When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention. For example, one or more portions of methods or techniques described above may be performed in a different order (or concurrently) and still achieve desirable results.

What is claimed is:

1. A network device, comprising:
   a packet memory configured to store packet data corresponding to a multicast (MC) packet received by the network device from a network link;
   a packet processor configured to at least to determine two or more ports via which the MC packet is to be transmitted from the network device; and
   a memory controller device coupled to the packet memory, the memory controller device configured to
      buffer received read requests in a read request buffer until the packet memory is available for servicing the read requests, wherein the read request buffer includes a plurality of entries for storing respective indications of client devices from which read requests were received by the memory controller device,
      determine that two or more pending read requests received by the memory controller device are to read packet data from a particular memory location in the packet memory,
      in response to the determining, merge the two or more read requests into a single read request that is stored in a single entry of the pending read request buffer,
      in response to the determining, read the packet data a single time from the particular memory location, and
      provide respective instances of the packet data read from the particular memory location to respective two or more read client devices for subsequent transmission of the packet data via the two or more ports determined by the packet processor.

2. The network device of claim 1, wherein the memory controller device is further configured to:
   service the single read request by reading the packet data a single time from the memory location in the packet memory.

3. The network device of claim 1, wherein the memory controller device is configured to buffer received read requests in a read request buffer until the packet memory is available for reading packet data from respective memory locations indicated by the respective read requests.

4. The network device of claim 1, wherein the plurality of entries in the pending read request buffer include i) respective first fields to store a memory location indicated by a read request and ii) respective second fields to store indications of client devices from which read requests to read packet data from the memory location indicated in the corresponding first field were received by the memory controller device.

5. The network device of claim 4, wherein the memory controller device is configured to:
   receive a particular read request of the two or more read requests from a particular read client device of the two or more read client devices,
   search the read request buffer to identify an entry in which the first field matches a particular memory location indicated in the particular read request, and
   in response to identifying the entry in which the first field matches the particular memory location indicated in the particular read request, update the second field of the entry to include an indication of the particular read client device from which the particular read request was received by the memory controller device.

6. The network device of claim 1, wherein the memory controller device is configured to:
   after reading the packet data from the particular memory location, replicate the packet data to generate two or more instances of the packet data, and
   provide respective ones of the two or more instances of the packet data to the respective two or more read client devices.

7. The network device of claim 1, wherein a read client device of the two or more read client devices is configured to:
   generate a transmit packet to include i) packet data received from the memory controller device and ii) a header of the packet, and
   transmit the transmit packet via a port coupled to the read client device.

8. The network device of claim 7, wherein the packet memory comprises two or more memory banks shared among the two or more read client devices, wherein the two or more memory banks are configured to be accessed simultaneously.

9. A network device comprising:
   a packet memory configured to store packet data corresponding to a multicast (MC) packet received by the network device from a network link;

a packet processor configured at least to determine two or more ports via which the MC packet is to be transmitted from the network device;

a plurality of read client devices, including a first read client device configured to:
   determine that a new read request to be issued to a memory controller device by the first read client device is to read packet data from a same memory location, in the packet memory, for which i) the first read client device already issued a previous read request to the memory controller device and ii) the corresponding packet data has not yet been received from the memory controller device, and
   in response to determining that the new read request to be issued to the memory controller device is to read packet data from the same memory location, in the packet memory, for which i) the first read client device already issued the previous read request to the memory controller device and ii) the corresponding packet data has not yet been received from the memory controller device, not issue the new read request to the memory controller device;

wherein the network device further comprises the memory controller device, wherein the memory controller device is coupled to the packet memory and the plurality of read client devices, and wherein the memory controller device is configured to:
   determine that two or more pending read requests received by the memory controller device from the plurality of read client devices are to read packet data from a particular memory location in the packet memory,
   in response to the determining, read the packet data a single time from the particular memory location, and
   provide respective instances of the packet data read from the particular memory location to respective two or more read client devices for subsequent transmission of the packet data via the two or more ports determined by the packet processor.

10. The network device of claim 9, wherein the read client device is further configured to:
   receive the packet data from the memory controller device in response to the previous read request,
   replicate the packet data to generate multiple instances of the packet data, and
   forward a first instance of the multiple instances to a first port coupled to the read client device, the first port corresponding to the previous read request, and
   forward a second instance of the multiple instances to a second port coupled to the read client device, the second port corresponding to the new read request.

11. A method of reading, from a packet memory, data corresponding to multicast packets in a network device, the method comprising:
   storing, at a particular memory location in the packet memory, packet data corresponding to a multicast (MC) packet received by the network device from a network link;
   analyzing, at a packet processor, information in a header of the MC packet to determine two or more ports via which the MC packet is to be transmitted;
   buffering received read requests in a read request buffer until the packet memory is available for servicing the read requests, wherein the read request buffer includes a plurality of entries for storing respective indications of client devices from which read requests were received;
   determining, with a memory controller device, that two or more pending read requests are to read packet data from the particular memory location in the packet memory;
   in response to the determining that the two or more pending read requests are to read packet data from the particular memory location, merge the two or more read requests into a single read request that is stored in a single entry of the pending read request buffer;
   in response to determining that the two or more pending read requests are to read packet data from the particular memory location, reading, with the memory controller device, the packet data a single time from the particular memory location; and
   providing, with the memory controller device, respective instances of the packet data read from the particular memory location to respective two or more read client devices for subsequent transmission of the packet data via the two or more ports determined by the packet processor.

12. The method of claim 11, further comprising:
   servicing the single read request by reading the packet data a single time from the memory location in the packet memory.

13. The method of claim 11, further comprising buffering received read requests in a read request buffer until the packet memory is available for reading packet data from respective memory locations indicated by the respective read requests.

14. The method of claim 11, wherein the plurality of entries in the read request buffer include i) respective first fields to store a memory location indicated by a read request and ii) respective second fields to store indications of client devices from which read requests to read packet data from the memory location indicated in the corresponding first field were received by the memory controller device.

15. The method of claim 14, further comprising:
   receiving, at the memory controller device, a first read request of the two or more read requests is received from a first read client device,
   searching, with the memory controller device, the read request buffer to identify an entry in which the first field matches the particular memory location indicated in the first read request, and
   in response to identifying the entry in which the first field matches the particular memory location indicated in the first read request, updating, with the memory controller device, the second field of the entry to include an indication of the first read client device from which the first read request was received by the memory controller device.

16. The method of claim 11, further comprising:
   after reading the packet data from the particular memory location, replicating, with the memory controller device, the packet data to generate two or more instances of the packet data, and
   wherein providing the packet data read from the particular memory location to respective two or more read client devices comprises providing respective ones of the two or more instances of the packet data to the respective two or more read client devices.

17. The method of claim 11, further comprising
   generating, at a read client device of the two or more read client device, a transmit packet to include that packet data received by the read client device from the memory controller device, and transmitting the transmit packet via a port coupled to the read client device.

18. The method of claim 11, wherein:
the packet memory comprises two or more memory banks shared among the two or more read client devices, and
the method further comprises servicing multiple read requests by simultaneously accessing the two or more read client devices.

19. A method of reading, from a packet memory, data corresponding to multicast packets in a network device comprising:
storing, at a particular memory location in the packet memory, packet data corresponding to a multicast (MC) packet received by the network device from a network link;
analyzing, at a packet processor, information in a header of the MC packet to determine two or more ports via which the MC packet is to be transmitted;
determining, at a first read client device among a plurality of read client devices, that a new read request to be issued by the first read client device to a memory controller device is to read packet data from a particular memory location, in the packet memory, for which i) the first read client device already issued a previous read request to the memory controller device and ii) the corresponding packet data has not yet been received from the memory controller device
in response to determining that the new read request to be issued to the memory controller device is to read packet data from a particular memory location, in the packet memory, for which i) the first read client device already issued the previous read request has been issued to the memory controller device and ii) the corresponding packet data has not yet been received from the memory controller device, not issuing the new read request to the memory controller device;
determining, with the memory controller device, that two or more pending read requests respectively received from two or more client devices among the plurality of client devices are to read packet data from the particular memory location in the packet memory;
in response to determining that the two or more pending read requests are to read packet data from the particular memory location, reading, with the memory controller device, the packet data a single time from the particular memory location; and
providing, with the memory controller device, respective instances of the packet data read from the particular memory location to the respective two or more read client devices for subsequent transmission of the packet data via the two or more ports determined by the packet processor.

20. The method of claim 19, further comprising:
receiving, at the first read client device, the packet data from the memory controller device in response to the previous read request,
replicating, at the first read client device, the packet data to generate multiple instances of the packet data, and
forwarding a first instance of the multiple instances to a first port coupled to the first read client device, the first port corresponding to the previous read request, and
forwarding a second instance of the multiple instances to a second port coupled to the first read client device, the second port corresponding to the new read request.

\* \* \* \* \*